Feb. 8, 1944.                W. W. GARDNER                2,340,953
                        CUTTING OR SAWING MACHINE
                         Filed Dec. 23, 1941

INVENTOR.
Wallace W. Gardner
BY Ramsey, Kent, Chisholm and Lutz
his ATTORNEYS

Patented Feb. 8, 1944

2,340,953

UNITED STATES PATENT OFFICE 2,340,953

CUTTING OR SAWING MACHINE

Wallace W. Gardner, Lancaster, Pa., assignor to De Walt Products Corporation, Lancaster, Pa., a corporation of Pennsylvania Application December 23, 1941, Serial No. 424,207

1 Claim. (Cl. 143—47)

This invention relates to improvements in cutting or sawing machines and more particularly to machines of the foregoing character utilizing a high speed cutting element.

An object of the present invention is to provide adjustable means attached to a supporting arm of the machine for limiting the path of travel of the cutting element.

Another object of the invention is to provide, in a machine of the foregoing character, a captive stop member which can be adjusted longitudinally of a supporting member for limiting the path of travel of the cutting element.

A further object of the invention is to provide a captive stop member so shaped that a part thereof lies out of the path of travel of the cutting element carrier and another part thereof can be interposed in such path of travel.

A further object of the invention is to provide a captive adjustable stop member so secured to an arm of a cutting machine that the adjustable part thereof is readily available for manipulation.

An additional object of the invention is to provide a captive stop member movable along a guide disposed at the side of a horizontal arm, such stop member having an angular part underlying the arm and disposed in the path of travel of the carrier for the cutting element.

In carrying out the foregoing and other objects of the invention, a machine incorporating the same can be made up of the usual base, elevator column and horizontally extending arm which can be adjustable about the vertical axis defined by the column. A cutting element is mounted for high speed rotation with the motive power therefor supplied by a motor or other suitable agency which in turn can be adjusted both about a horizontal axis and about a vertical axis. The carrier for this cutting element can be made to move longitudinally relative to the arm by a suitable carriage or other arrangement. Inasmuch as cutting elements of various diameters may be used at different times with the same mechanism, it is desirable that the path of travel of the carrier for the cutting element be limited so that this cutting element will not approach too closely to the elevator column. In addition, it is often desirable to limit the path of travel of the cutting element so that various cutting operations can be accurately performed. To this end the present invention provides a captive adjustable stop member secured to the arm for longitudinal movement relative thereto, such stop member having a part lying in the path of travel of the carrier for the cutting element. This captive stop member can be moved to any one of a plurality of positions along the arm so that approach of the cutting element to the elevator column can be limited. In this manner precautions can be taken that the cutting element will not actually contact the elevator arm with consequent detriment to the element and likewise the path of travel of this element can be limited so that routing and other operations can be performed.

Other features, objects and advantages of the invention will become apparent by reference to the following detailed description of the accompanying drawing wherein Fig. 1 is a fragmentary side elevation of a cutting or sawing machine, such view showing the captive stop member in place on the arm of the machine and with a part thereof disposed in the path of movement of the cutter carrier;

Figure 1:
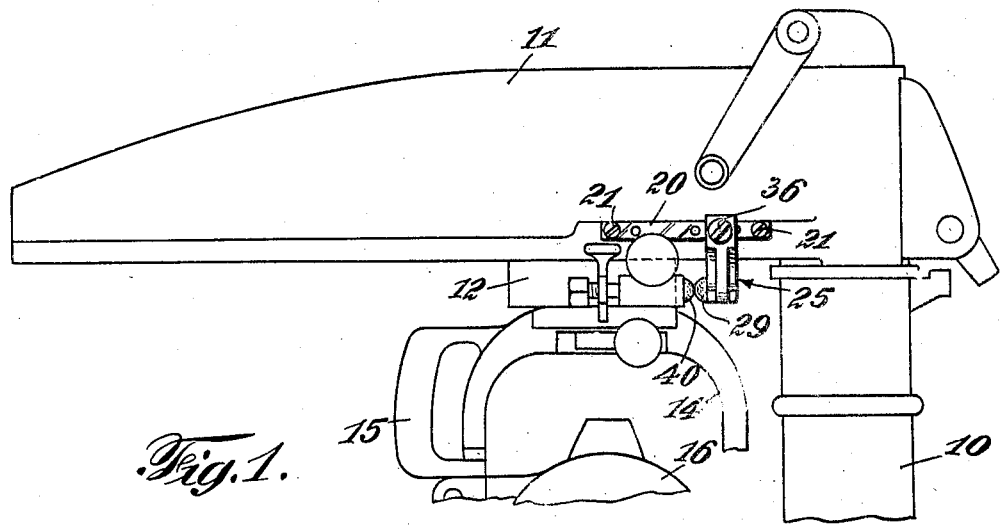
Figure 2:
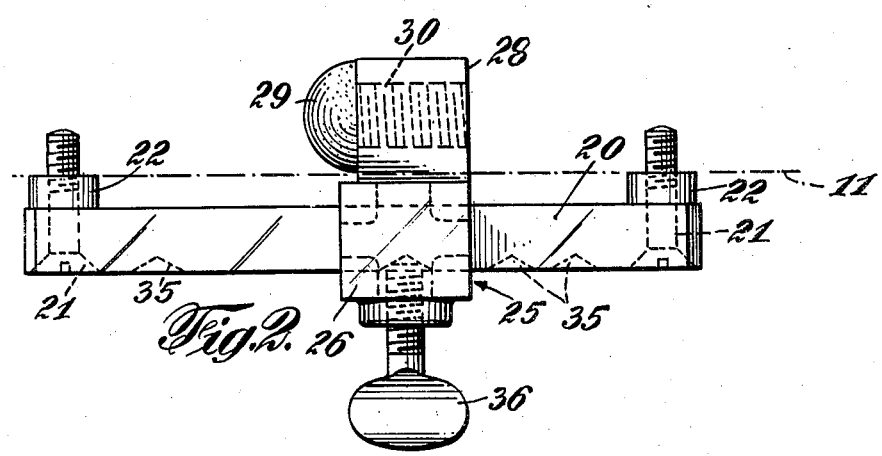
Fig. 2 is an enlarged plan view of the assembly of guide bar, spacers, means for attaching the same to the saw arm, and the captive stop member.
Figures 3, 4:
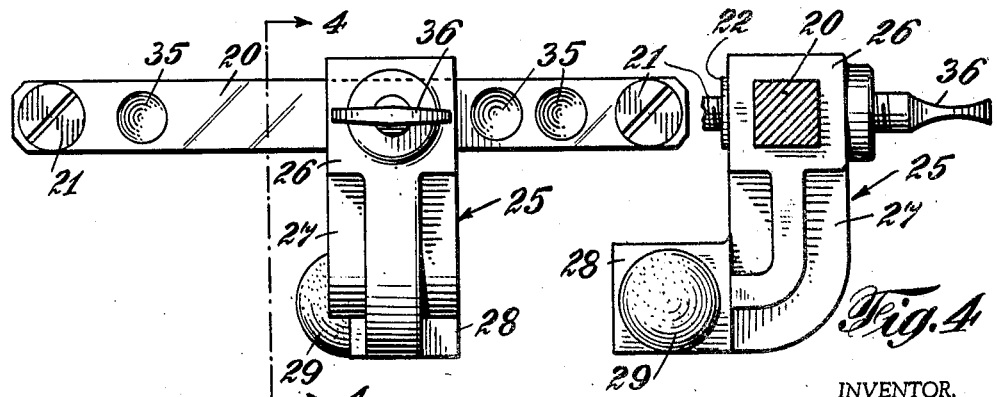
Fig. 3 is an elevational view of the same parts, looking from the side of the machine.
Fig. 4 is a section taken substantially on the line 4—4 of Fig. 3.

Referring now to the drawing and particularly to Fig. 1, 10 indicates an elevator column for a cutting or sawing machine, which column is supported by a base, not shown, and which has a horizontally extending arm 11 pivotally mounted at the top thereof for rotation about the axis defined by the column. The under part of a carriage movable along the arm 11 is indicated at 12 but inasmuch as the manner in which this carriage is mounted for movement along the arm forms no part of this invention, such mechanism has not been illustrated. Depending from the under part of the carriage 12 for rotation about a vertical axis is a motor yoke 14 to the forward edge of which is affixed a handle part 15 preferably integral with the yoke. A saw motor, shown in fragmentary fashion at 16, can be secured in the yoke for rotation about a horizontal axis. Inasmuch as this mechanism is well known in the art, complete illustration of the same has not been made.

Since the motor 16 may be used to drive saws of different diameters, provision is made for limiting the travel of the carriage 12 and consequently of the saws toward the column 10. For this purpose a guide bar 20 is secured to the outer side wall of the arm 11, such guide bar being of substantially square shape in cross-section and being spaced from the outer side wall of the arm.

To secure the bar to the arm, use is made of two screws 21 passing through the ends of the bar 20 and threaded into suitable threaded apertures in the side wall of the arm. Proper spacing of the guide bar relative to the arm is accomplished by collar members 22 through which the screws freely pass and which determine the distance between the side wall of the arm and the inner vertical edge of the bar 20.

Associated with the guide bar 20 is a stop member, indicated generally at 25, which comprises a top boss portion 26, a downwardly extending ribbed part 27 and an arm part 28 extending at right angles to the bottom of the downwardly extending part 27. The boss part 26 has a square aperture therethrough of a size to receive the guide bar 20. The arm part 28 of the stop member is so arranged as to underlie the arm 11 of the machine when the bar and associated stop 25 are secured to the arm of the machine. A rounded-head rubber bumper member 29 has a shank 30 inserted into an aperture in the arm 28. This aperture may have the wall thereof threaded to aid in retaining the shank therein or may have a smooth bore if desired.

In order that the stop may be adjusted lengthwise of the guide bar 20, a plurality of indentations 35 are provided in the outer vertical wall of this bar while a thumb screw 36 passes through an aperture in the outer vertical wall of the boss part 26 of the stop. The inner end of this thumb screw can engage any one of the indentations 35 selectively. If desired however, the indentations may be omitted and reliance placed entirely on frictional engagement between the inner end of the thumb screw and the outer vertical wall of the bar 20 for determining the relative position of the stop along this bar.

The carriage 12 has a rubber bumper 40 secured to a part thereof and so located that its line of travel along and under the arm 11 coincides with the possible line of adjustive movement of the bumper 29.

In the operation of the mechanism hereinbefore described, the stop 25 may be fixed along the guide bar 20 at any desired location depending upon operating conditions. For example, if the saw blade used in the machine is of such diameter that it might contact the column 10 when the stop is in its position most nearly adjacent this column, then the stop can be adjusted along the bar to a suitable position in which a clearance between the blade and the column is assured. Furthermore, in certain types of work uitilizing a cutting element in the machine, it may be desirable to cut only part way across a piece of material. In this event, the stop can be so adjusted along the bar 20 as to limit the path of travel of the carriage so that the cuting element can move across the material only to the desired extent. While bar 20 has been shown of relatively short length in comparison with the length of the arm 11, it will be evident that this bar may be of any desired length and in fact, could even extend the full length of the arm. However, for normal operating conditions the range of adjustment of the stop provided by the length of bar shown will be sufficient.

From the foregoing it will be seen that the present invention provides adjustable captive stop mechanism for limiting the path of travel of a cutting element carried by a suitable carriage, which adjustable stop is readily accessible to an operator since the set screw locking member 36 is conveniently located at the side of the supporting arm 11. This adjustable stop member can be locked in any of a plurality of positions, certain of which may be predetermined by formations in the guide bar, or it may be locked in any desired position by frictional contact between the locking screw and the bar. Furthermore, it will be evident that modification beyond the illustrated embodiment can readily be made and accordingly the invention is to be limited only by the following claim.

What is claimed is:

In a cutting machine having a horizontal supporting arm and a cutter carriage depending from the arm and reciprocable lengthwise of the arm, the improvement which comprises: a rectangular guide rod extending lengthwise of the arm and mounted in spaced relation to the side of the arm; an L-shaped stop member having a vertical leg and a horizontal leg, the vertical leg having a rectangular hole pierced by the rectangular guide rod whereby the stop member is captive on the rod in slidable but non-rotative relation to the rod, and the horizontal leg projecting beneath said arm into the path of movement of said carriage; yielding bumper means to receive the impact between the carriage and the horizontal leg of the stop; and means to secure the stop in selective positions along said guide rod.

WALLACE W. GARDNER.